(12) United States Patent
Carlon

(10) Patent No.: US 9,500,879 B2
(45) Date of Patent: Nov. 22, 2016

(54) EYEWEAR

(76) Inventor: Roberto Carlon, Venice (IT)

( * ) Notice: Subject to any disclaimer, the term of this patent is extended or adjusted under 35 U.S.C. 154(b) by 48 days.

(21) Appl. No.: 14/006,709

(22) PCT Filed: Mar. 20, 2012

(86) PCT No.: PCT/IB2012/051330
§ 371 (c)(1),
(2), (4) Date: Apr. 18, 2014

(87) PCT Pub. No.: WO2012/127416
PCT Pub. Date: Sep. 27, 2012

(65) Prior Publication Data
US 2014/0218676 A1    Aug. 7, 2014

(30) Foreign Application Priority Data
Mar. 24, 2011    (IT) ................ BO2011A0152

(51) Int. Cl.
G02C 1/02      (2006.01)
G02C 5/00      (2006.01)
G02C 5/22      (2006.01)
G02C 5/14      (2006.01)
G02C 13/00     (2006.01)

(52) U.S. Cl.
CPC ............. G02C 1/02 (2013.01); G02C 5/008 (2013.01); G02C 5/14 (2013.01); G02C 5/2209 (2013.01); G02C 13/001 (2013.01); G02C 2200/10 (2013.01)

(58) Field of Classification Search
CPC ........... G02C 1/00; G02C 1/02; G02C 5/22; G02C 5/2209; G02C 5/229; G02C 2200/10
USPC ................ 351/110, 120, 140, 153
See application file for complete search history.

(56) References Cited

U.S. PATENT DOCUMENTS 5,469,232 A * 11/1995 Ichimura .................. 351/111
5,896,186 A *  4/1999 Roban ..................... 351/110

FOREIGN PATENT DOCUMENTS

| EP | 1 326 125 A2 | 7/2003 |
| EP | 1 662 294 A1 | 5/2006 |
| FR | 2 766 586 A1 | 1/1999 |
| WO | 98/19203 A1 | 5/1998 |
| WO | 2007/020670 A1 | 2/2007 |

OTHER PUBLICATIONS

International Search Report, dated Jun. 1, 2012, from corresponding PCT application.

* cited by examiner

*Primary Examiner* — Huy K Mai
(74) *Attorney, Agent, or Firm* — Young & Thompson

(57) ABSTRACT

Eyeglasses include lens elements (2, 3), sidepiece elements (4, 5) for supporting the eyeglasses and connecting elements (9) between the lens elements (2, 3) and the sidepiece elements (4, 5). The connecting elements (9) include a pin portion (10, 11) extending from the sidepiece elements (4, 5), and the lens elements (2, 3) have a hole (12, 13) for insertion of the pin portion (10, 11), the pin portion (10, 11) being inserted into the insertion hole (12, 13) to form elements for rotating the sidepiece elements (4, 5) relative to the lens element (2, 3).

17 Claims, 7 Drawing Sheets

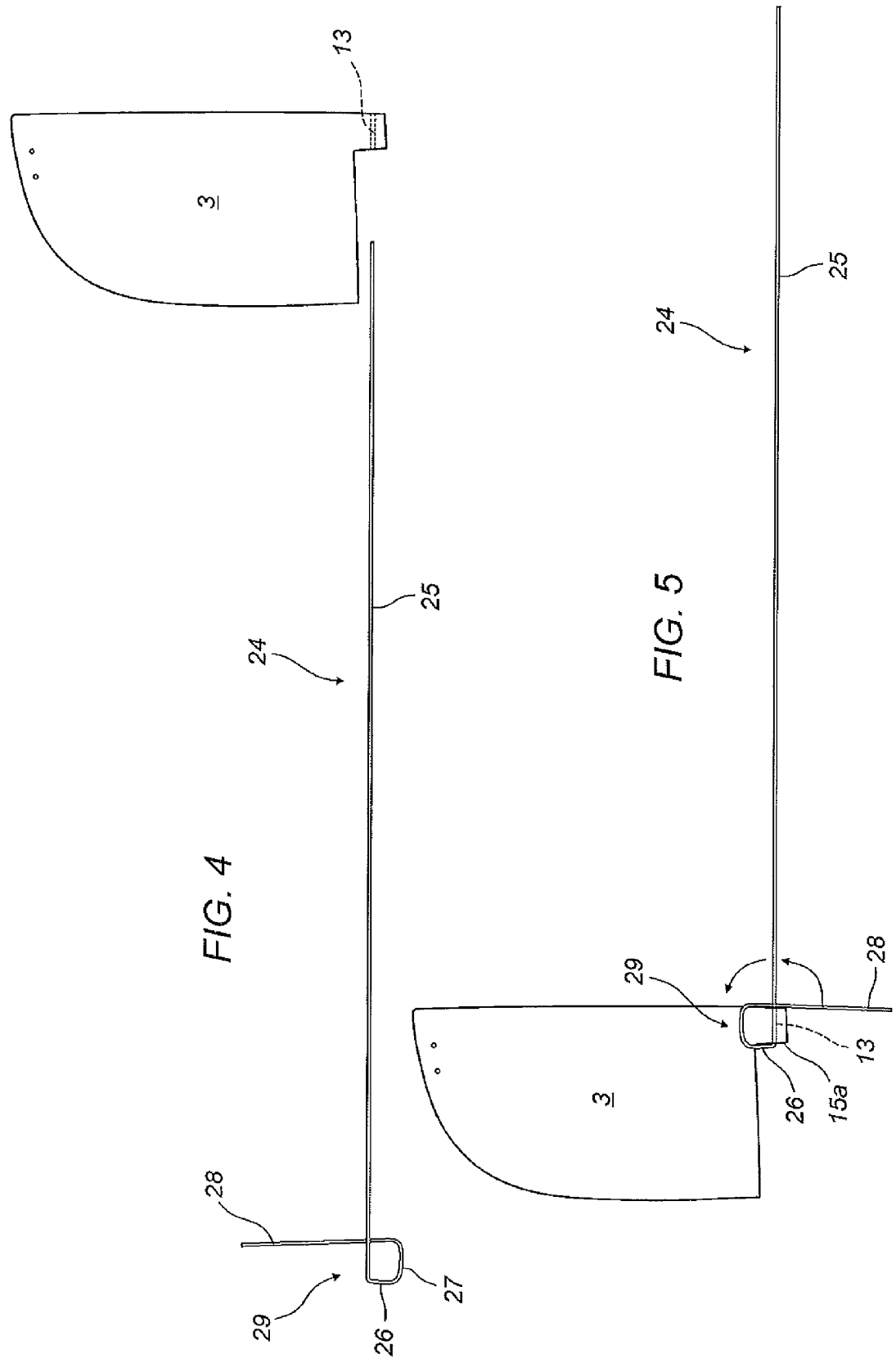

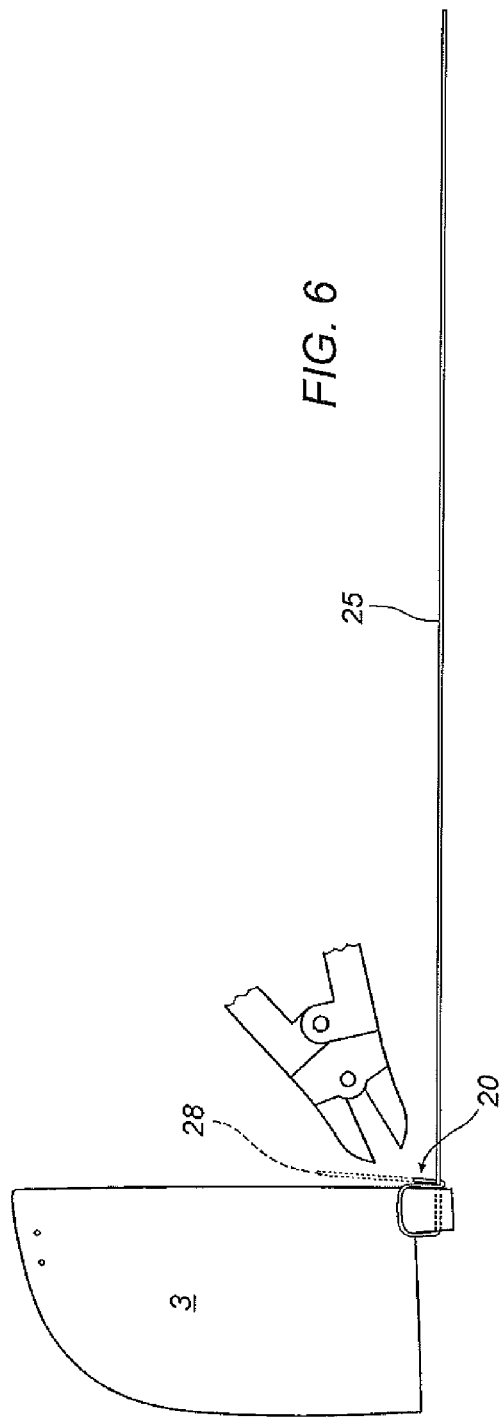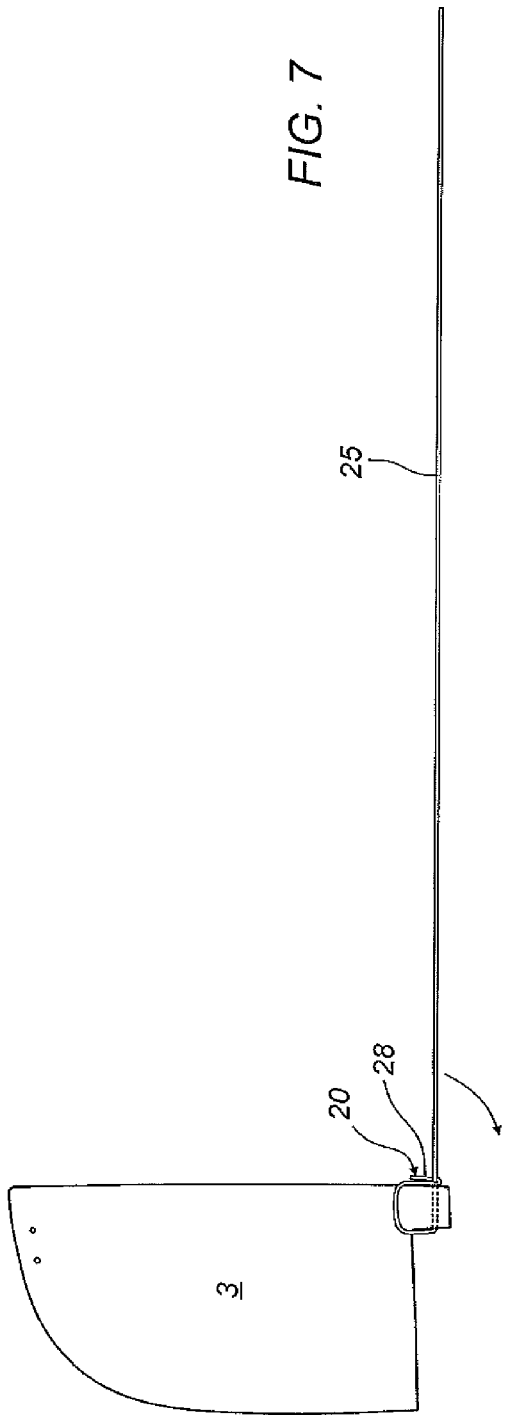

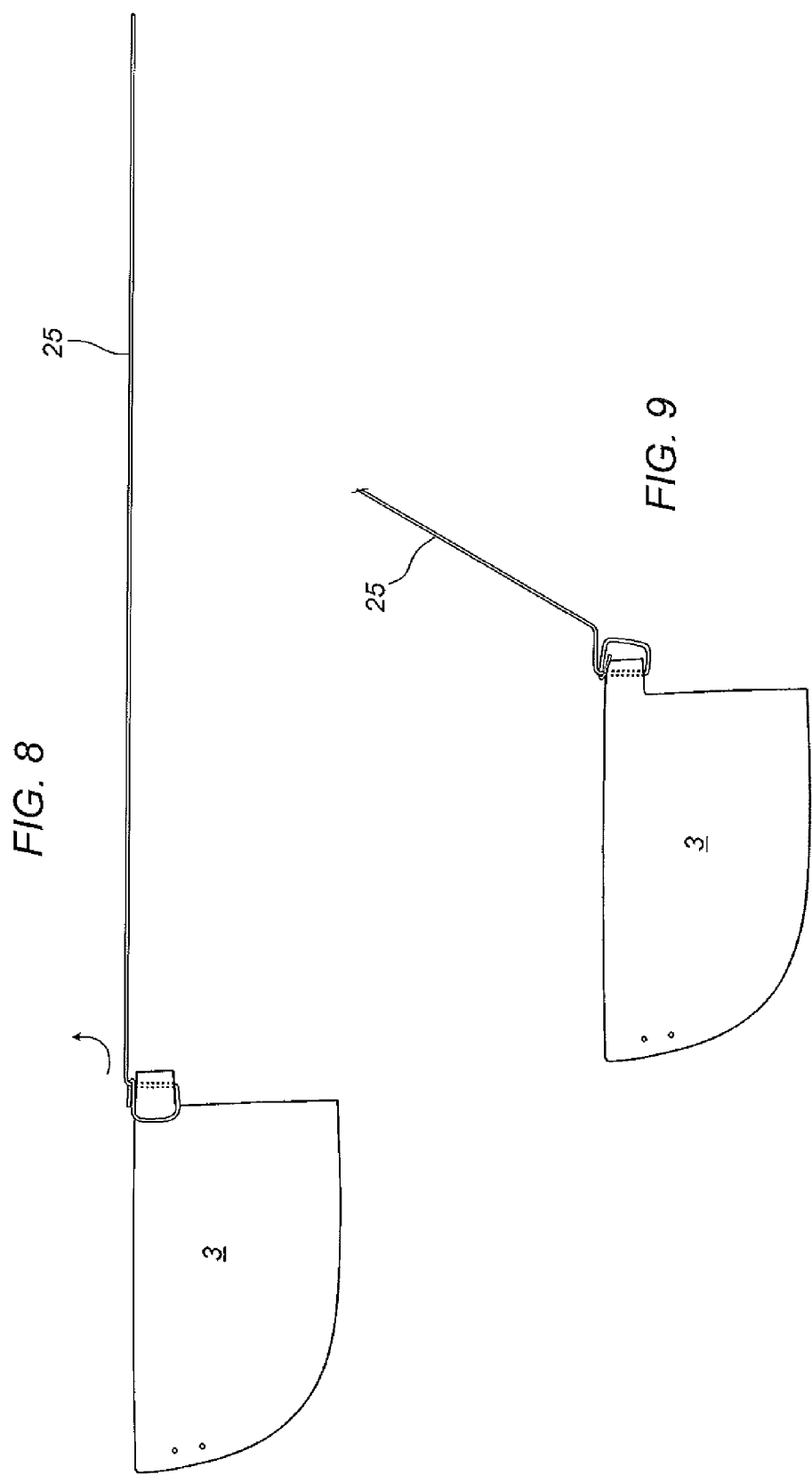

EYEWEAR

TECHNICAL FIELD

This invention relates to eyeglasses and, in particular, eyeglasses with an improved connection for the sidepieces.

BACKGROUND ART

In the eyewear trade, a general need is felt for eyeglasses where the connection between the sidepieces and the lenses, or the lens mount, is at once elegant and unobtrusive, easy to make and practical to use.

In particular, the trade feels the need for eyeglasses in which the connection between the sidepieces and the lenses, or the frame which mounts the lenses, is direct and does not require the use of intermediate fastening elements, in particular in the form of complex, additional articulation hinges.

Indeed, in traditional eyeglasses, the sidepieces and the lenses or the frame are usually connected using fastening screws, which can easily come loose and be lost, glue, which wears off and allows the connected parts to come apart, and welds, which constitute easily-broken points of weakness.

Another need is that for eyeglasses in which the connection between the sidepieces and the lens means have a particularly unobtrusive design, with obvious advantages in terms of elegance and simplicity of connection, since it does not require intermediate fastening elements.

SUMMARY OF THE INVENTION

This invention proposes a novel solution, alternative to the solutions known up to now, and/or, more specifically, aims to overcome one or more of the above mentioned drawbacks or problems, and/or to meet one or more of the needs inferable from the above.

In particular, it is provided eyeglasses comprising lens means, sidepiece means for supporting the eyeglasses and connecting means across the lens means and the sidepiece means, the eyeglasses being characterized in that the connecting means comprise a pin portion extending from the sidepiece means, the lens means having a hole for insertion of the pin portion, the pin portion being inserted into the insertion hole to form means for rotating the sidepiece means relative to the lens means.

This avoids the need to use additional hinges for articulating the sidepiece means relative to the lens means.

According to another advantageous aspect, it is provided eyeglasses comprising lens means and sidepiece means for supporting the eyeglasses and which constitute means for stopping the rotation of the sidepiece.

It is also provided an advantageous process which comprises a step of inserting a metal wire, which forms the sidepiece means of the eyeglasses, into an insertion hole in corresponding lens means of the eyeglasses, and at least one step of bending the metal wire to form means for rotating the sidepiece means relative to the lens means.

BRIEF DESCRIPTION OF THE DRAWINGS

Further features and advantages of the invention are more apparent in the detailed description below, with reference to a preferred, non-limiting, embodiment of eyeglasses as illustrated in the accompanying drawings, in which:

FIGS. 4 to 9 schematically illustrate a sequence of steps in a process for making the eyeglasses of the preceding figures;

DETAILED DESCRIPTION OF THE PREFERRED EMBODIMENTS OF THE INVENTION

Figure 1:
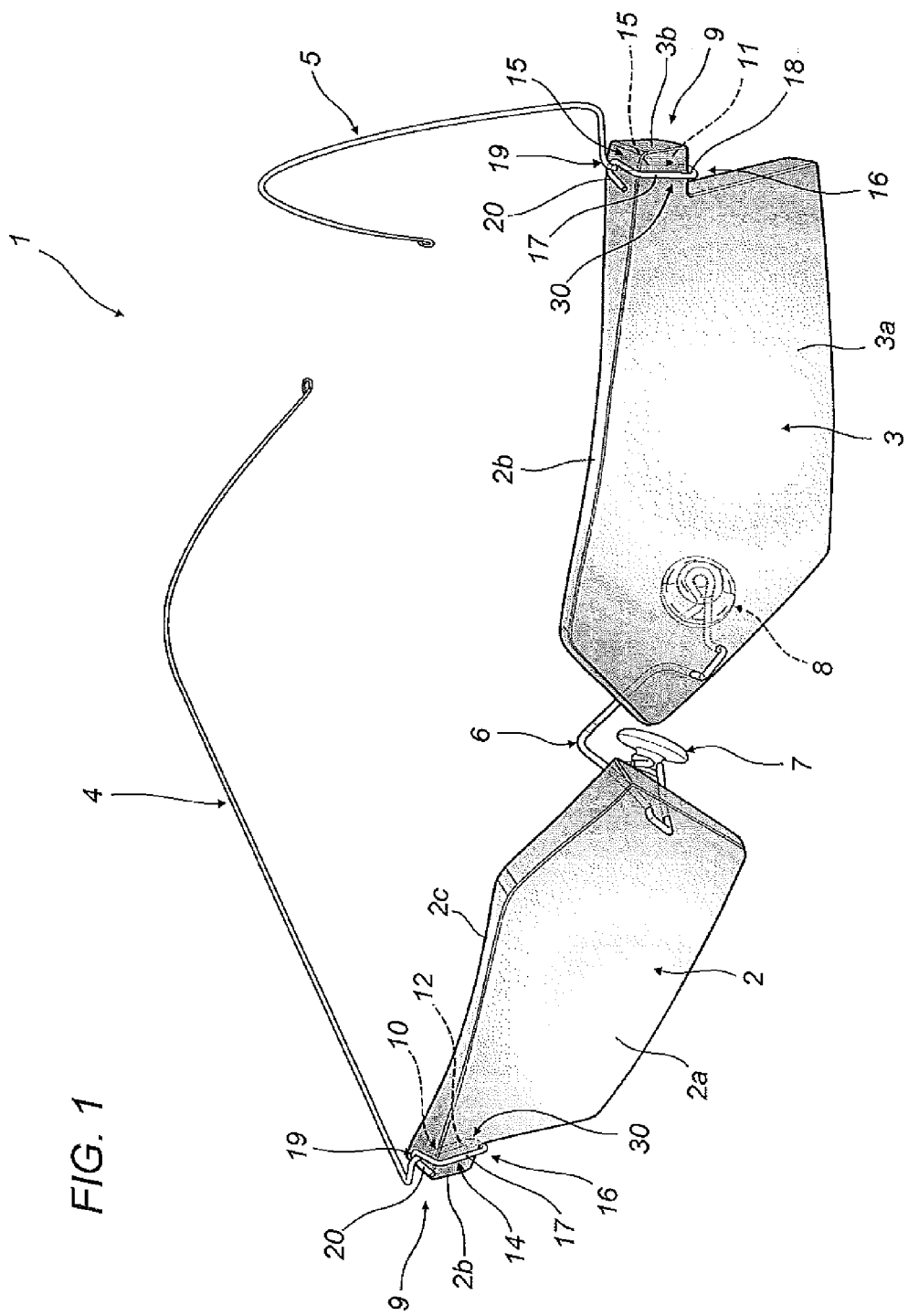
FIG. 1 is a schematic perspective view of eyeglasses according to this invention in a configuration with the sidepieces open.
Figure 2:
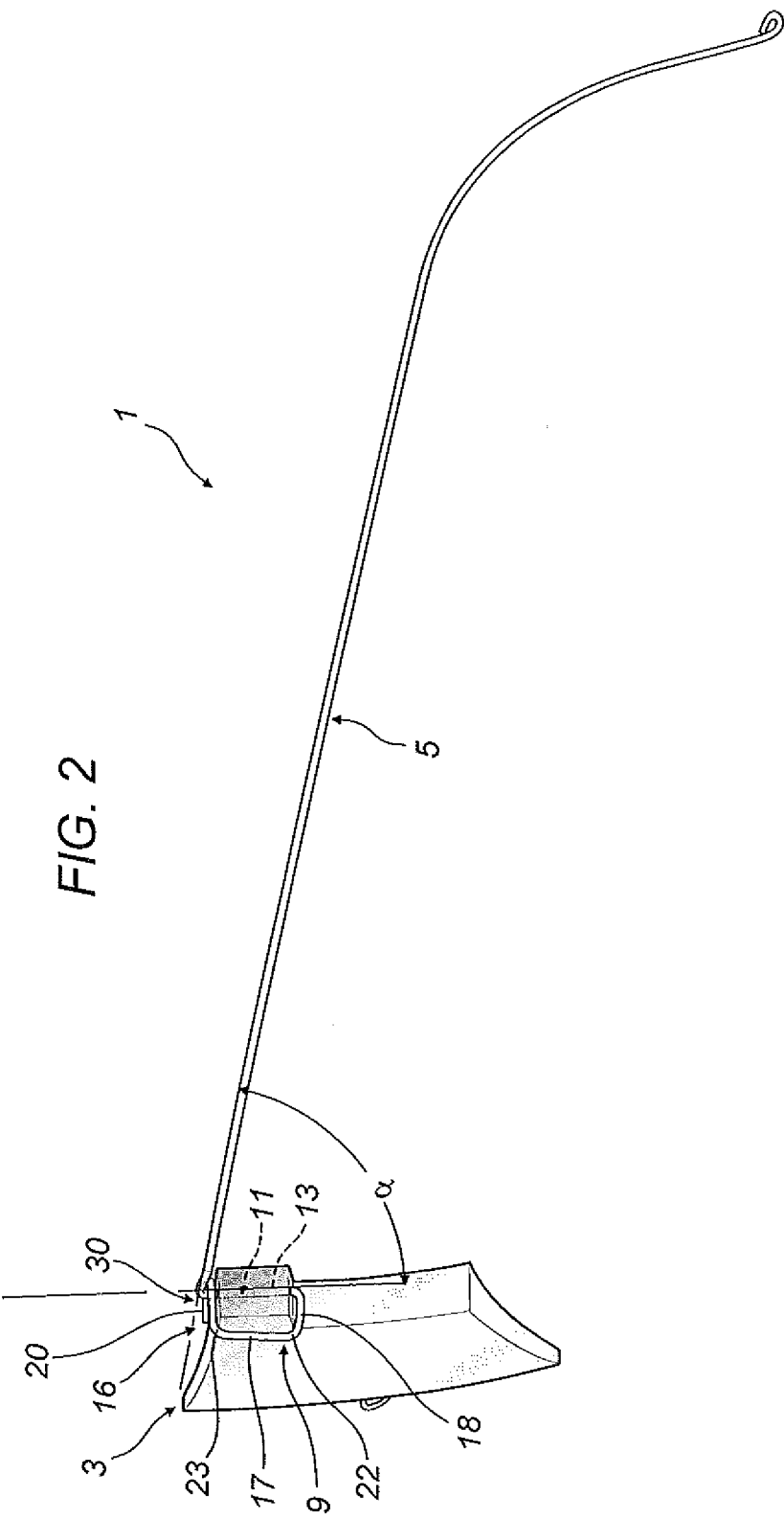
FIG. 2 is a schematic side view of the eyeglasses of FIG. 1.
Figure 3:
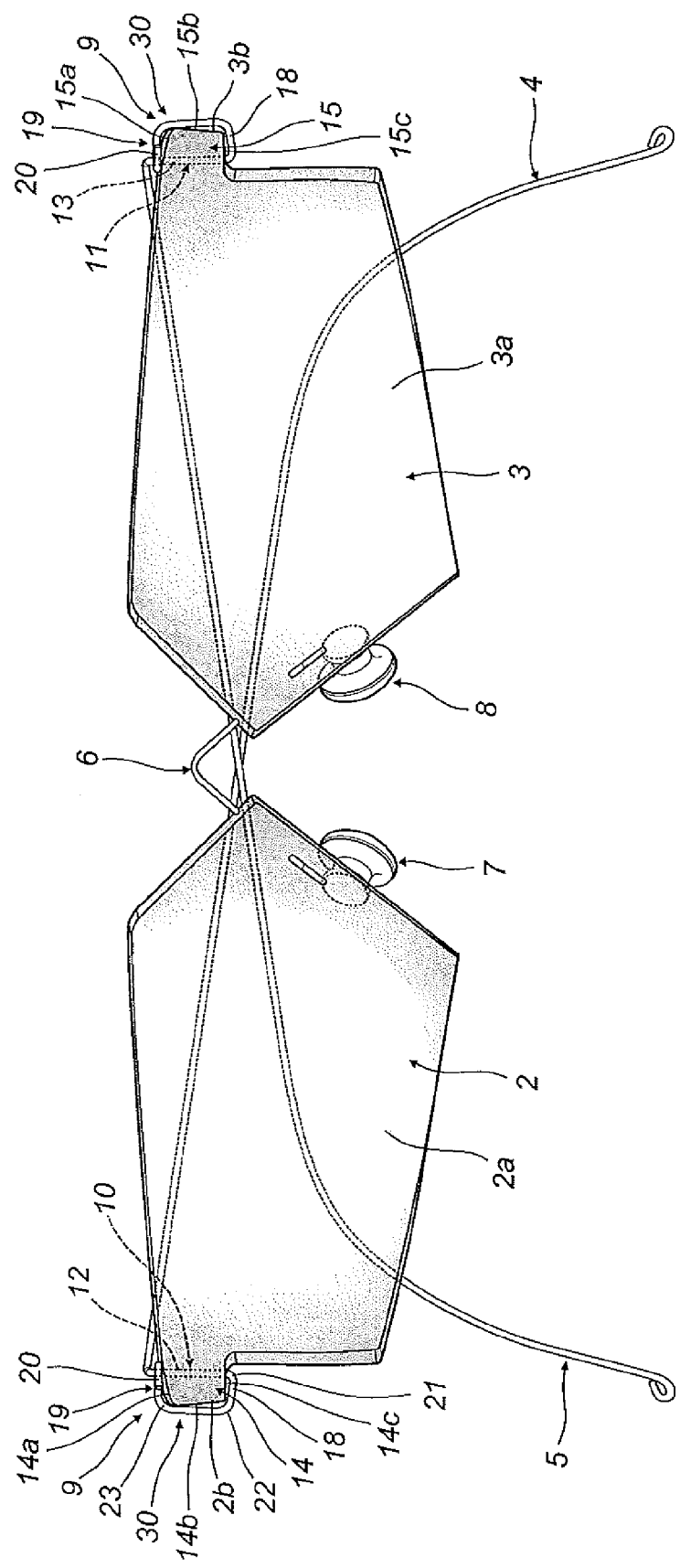
FIG. 3 is a schematic front view of the eyeglasses of the preceding figures in a configuration with the sidepieces closed.

With reference to the accompanying drawings and in particular with reference to FIGS. 1 to 3, the numeral 1 denotes eyeglasses according to this invention.

In the preferred embodiment illustrated, the eyeglasses 1 comprise lens means, defined by a first and a second lens 2, 3, set side by side, in particular, spaced from each other, and designed to be placed, in use, in front of the wearer's eyes.

Although this embodiment is especially preferred, in other embodiments which are not illustrated, the lens means also comprise, besides the lenses 2, 3. a frame which surrounds and supports the lenses 2, 3 themselves.

The eyeglasses 1 also comprise sidepiece means for keeping the lens means on the wearer's face, which, in the preferred embodiment described here, comprise respective first and second sidepieces 4, 5 and which are preferably made from a respective metal wire, in particular of titanium.

In other embodiments the sidepiece means may comprise sidepieces comprising portions made of metal wire and portions made of another material, for example, horn.

The eyeglasses 1 further comprise a bridge 6 for connecting the lenses 2, 3.

The bridge 6 is made preferably from metal wire and is inserted directly into the bodies of the lenses 2, 3 through respective holes.

At the ends of it, the bridge 6 is preferably provided with a first and a second nose pad 7, 8.

In another embodiment not illustrated, as already mentioned, the lens means comprise a frame and the bridge 6 is inserted directly into the frame.

Alternatively, the bridge is made directly in the frame, preferably of horn, which mounts the lenses 2, 3.

As illustrated, the eyeglasses 1 comprise means 9 for connecting the sidepiece means to the lens means.

Preferably, the eyeglasses 1 comprise means 9 for connecting the sidepieces 4, 5 to the lenses 2, 3.

In the preferred embodiment illustrated, the connecting means 9 operate between the lenses 2, 3 and the sidepieces 4, 5.

In other words, through the connecting means 9, the sidepieces 4, 5 are connected directly to the lenses 2, 3.

Preferably, also, the connecting means 9 are defined by the sidepieces 4, 5 themselves, which are suitably shaped, as described below, in such a way as to engage the respective lenses 2, 3.

More specifically, the connecting means 9 comprise a first and a second pin portion 10, 11, or preferably a pin, which extends from the respective sidepiece 4, 5.

The lenses 2, 3 each have a respective hole 12, 13 into which the respective pin portion 10, 11 is inserted.

It should be noted that each pin portion 10, 11 engaged in the respective hole 12, 13 constitutes means for rotating the sidepieces 4, 5 relative to the lenses 2, 3.

The sidepieces 4, 5 are therefore rotatable about the respective pin portions 10, 11 relative to the lenses 2, 3 which, as mentioned above, embody the above mentioned lens means.

Advantageously, each of the holes 12, 13 is made directly in the respective lens 2, 3.

Generally speaking, the holes 12, 13 are preferably made directly in the above mentioned lens means.

In practice, as illustrated, the hole 12, 13 and the pin portion 10, 11 inserted into the hole, extend substantially vertically, that is to say, in the plane in which the lens means extend which is, in particular, parallel to, or in use, in front of, the wearer's face.

Advantageously, the rotation means thus formed are mechanically simple, unobtrusive and aesthetically pleasing.

Preferably, as illustrated, the holes 12 and 13 and the corresponding pin portions 10, 11 extend from the lens means 3 in such a way that the pantoscopic angle of the eyeglasses 1 is between 5 sexagesimal degrees and 20 sexagesimal degrees.

The preferred value of the pantoscopic angle depends mainly on the use the eyeglasses 1 are intended for.

Still more preferably, the holes 12 and 13 and the corresponding pin portions 10, 11 extend from the lens means 3 in such a way that the pantoscopic angle of the eyeglasses 1 is between 10 sexagesimal degrees and 12 sexagesimal degrees.

In other words, the connecting means 9 are shaped in such a way that the eyeglasses 1, in use, that is to say, when worn by a user not illustrated, have a pantoscopic angle of between 5 sexagesimal degrees and 20 sexagesimal degrees.

Preferably, the connecting means 9 are shaped in such a way that the eyeglasses 1, in use, that is to say, when worn by a user not illustrated, have a pantoscopic angle of between 10 sexagesimal degrees and 12 sexagesimal degrees.

In practice, therefore, the pins 10 and 11 and the corresponding holes 12, 13 are shaped in such a way that, in use, the eyeglasses 1 have a pantoscopic angle of between 5 sexagesimal degrees and 20 sexagesimal degrees, or preferably between 10 sexagesimal degrees and 12 sexagesimal degrees.

With reference to FIG. 2, it may be observed that preferably the preferred values of the pantoscopic angle are obtained if the angle "α" between the sidepiece 4, 5 and the respective pin 10, 11 (for connecting the lens means) is between 50 sexagesimal degrees and 90 sexagesimal degrees.

Preferably, the value of the angle "α" is a function of the angle of inclination of the respective hole 12, 13 relative to the lens means (angle "γ" defined below).

Preferably, the angle "α" is measured considering a projection of the pin 10, 11 and of the respective sidepiece 4, 5 onto the plane of FIG. 2.

Figure 10:
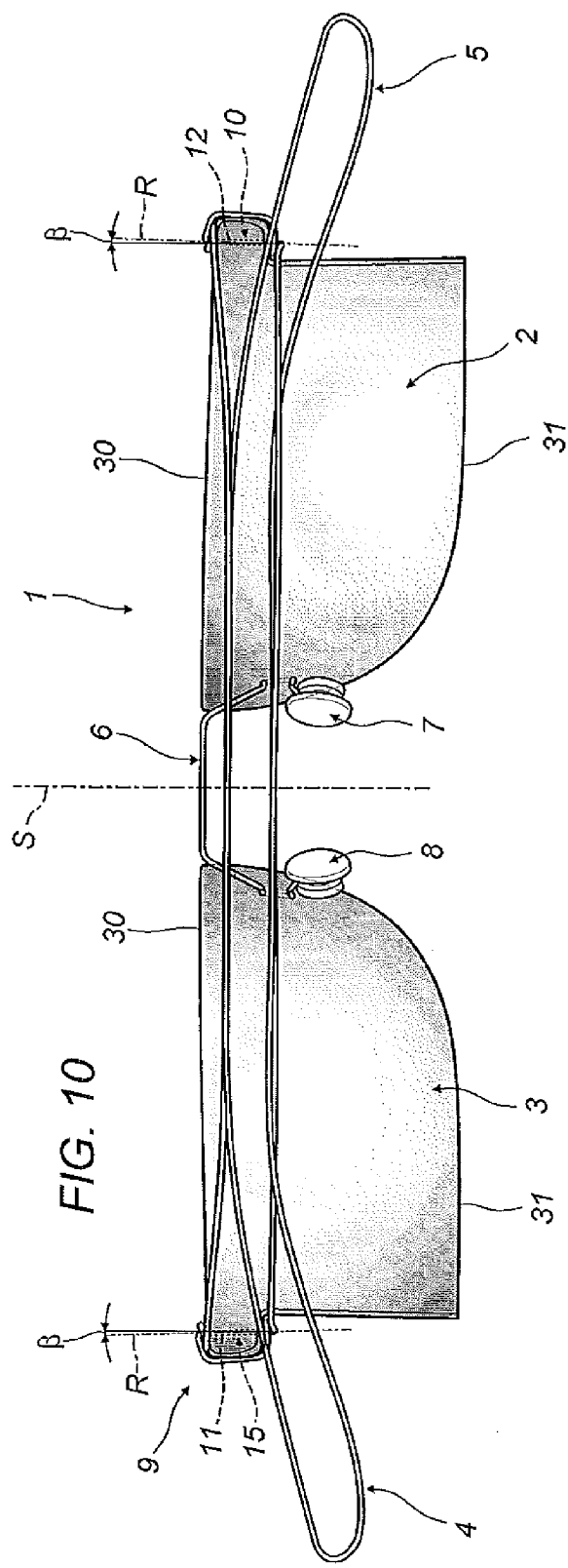
FIG. 10 is a schematic rear view of a second embodiment of eyeglasses according to this invention in a configuration with the sidepieces closed.

With reference to FIG. 10, it may be observed that in the preferred embodiment illustrated by way of an example, in a closed configuration of the eyeglasses 1, that is to say, with the sidepieces 4, 5 folded, the sidepieces remain within the space delimited by the lens means.

In other words, the means 9 for connecting the sidepieces 4, 5 to the lens means, that is to say, in particular, to the lenses 2, 3, are shaped in such a way that the sidepiece means 4, 5 in a closed configuration are positioned within the space delimited by the upper edge 30 of the lens means and by the lower edge 31 of the lens means.

Preferably, to obtain sidepieces 4, 5 positioned in this way when they are in the closed configuration, the angle "β" between the axis of rotation R of the sidepiece 4, 5 and a section plane S of the eyeglasses 1 is contemplated to be between 0 sexagesimal degrees and 10 sexagesimal degrees.

For simplicity, FIG. 10 shows, in the drawing plane, the projections of planes parallel to the plane S at the holes 10, 11.

In particular, the angle "β" is measured from the vertical to the outer lateral face 2b, 3b of the lens means, in particular of the respective lens 2, 3.

In practice, the axes of rotation R of the pins 10, 11 are convergent; in particular, the axes R are convergent under the bridge 6.

Figure 11:
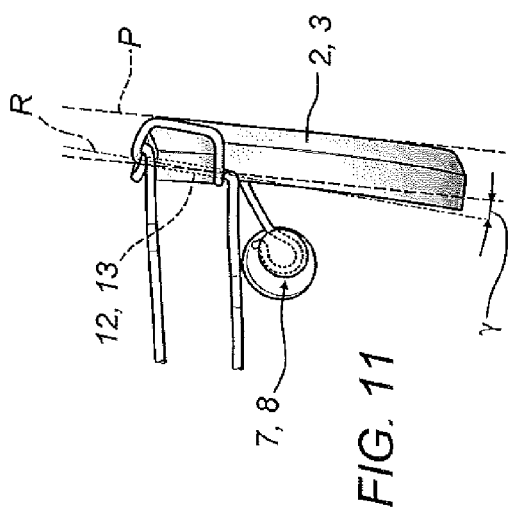
FIG. 11 is a schematic side view of a detail of the eyeglasses of FIG. 10.

With reference to FIG. 11, it may be observed that each hole 12, 13 is preferably inclined at the aforementioned angle "γ", to a plane P perpendicular to the optical axis of the respective lens 2, 3 (with reference in particular to a projection of the axis of the hole and of the plane P onto the plane of FIG. 11).

Preferably, the value of the angle "γ" is between 0 sexagesimal degrees and 10 sexagesimal degrees.

The preferred size of the angle "γ" contributes to positioning the sidepieces within the delimited space of the lens means in the closed configuration of the eyeglasses 1.

Advantageously, in order to allow the respective sidepiece to rotate, each hole 12, 13 is at a predetermined distance from the front transversal edge 2a, 3a of the lens means, in particular of the respective lens 2, 3.

Advantageously, also, the holes 12, 13 are at a predetermined distance from the outer lateral face 2b, 3b of the lens means, in particular of the respective lens 2, 3.

Preferably, as illustrated, the distance of the holes 12, 13 from the front transversal edge 2a, 3a of the lens means, in particular of the lenses 2, 3, is equal to the distance between the selfsame holes 12, 13 and the outer lateral face 2b, 3b of the lens means, in particular of the respective lens 2, 3.

As illustrated, the holes 12, 13 are preferably equidistant from the front transversal edge 2a, 3a of the lens means, in particular, equidistant from the transversal edge 2a, 3a of the respective lens 2, 3 and from the rear transversal edge 2c, 3c of the lens means, in particular, from the rear transversal edge 2c, 3c of the respective lens 2, 3.

In the preferred embodiment illustrated by way of an example, the eyeglasses 1 comprise an extension portion 14, 15, in particular a lateral one, which extends from the lens means, in particular from the lenses 2, 3, and in which the insertion holes 12, 13 are made.

As illustrated, the respective extension portion is delimited, in use, by an upper face 14a, 15a, a lower face 14b, 15b and a lateral face 14c, 15c spaced from the corresponding lateral edge of the main part of the lens means.

In other words, advantageously, each lens 2, 3 has a respective extension portion 14, 15 in which, through the holes 12, 13, the sidepiece means, in particular, the sidepieces 4, 5, are engaged.

Each of the insertion holes 12, 13 is preferably made in the corresponding extension portion 14, 15.

In the preferred embodiment illustrated, each extension portion 14, 15 extends substantially in the same plane as the lens means.

In particular, each extension portion 14, 15 extends substantially in the same plane as the respective lens 2, 3.

In the configuration of use, the extension portion 14, 15 extends horizontally or substantially horizontally.

With reference in particular to FIG. 1, it may be observed that the above mentioned connecting means 9 comprise means 16 for stopping the rotation of the sidepiece means, in particular of the sidepieces 4, 5.

In the preferred embodiment, the rotation stop means 16 comprise, in particular for each sidepiece 4, 5, an abutment portion 17 which is substantially parallel to the pin portion 10, 11 and which is movable with the sidepiece means, in particular with the sidepieces 4, 5.

For simplicity, in the description of the rotation stop means which follows, reference to only one sidepiece shall be understood to apply to both sidepieces.

The abutment portion 17 is movable together with the respective sidepiece 4, 5 between a first position, illustrated in FIG. 3, away from the front transversal edge 2a, 3a of the lens means, in particular of the respective lens 2, 3, and a second position, illustrated for example in FIG. 1, where it is in abutment against the front transversal edge 2a, 3a of the lens means, in particular of the lenses 2, 3.

Preferably, the abutment portion 17 extends vertically or substantially vertically, considering in particular the configuration of use of the eyeglasses 1.

In the example illustrated, the abutment portion 17 extends from the corresponding pin portion 10, 11.

Advantageously, as illustrated, the rotation stop means 16 comprise a connecting portion 18 joining the abutment portion 17 to the pin portion 10, 11.

Preferably, the connecting portion 18 extends under the lens means, in particular, under the lenses 2, 3.

Preferably, the connecting portion 18 extends under the extension portion 14, 15.

Preferably, the connecting portion 18 extends horizontally or substantially horizontally.

In the preferred embodiment illustrated, the rotation stop means 16 comprise a second connecting portion 19 joining the abutment portion 17 to the pin portion 10, 11.

Preferably, the second connecting portion 19 extends horizontally or substantially horizontally, considering a configuration of use of the eyeglasses 1.

Preferably, as illustrated, the second connecting portion 19 extends above the lens means, in particular, above the lenses 2, 3.

Advantageously, the connecting portion 19 extends above the extension portions 14, 15 of the lens means, in particular, of the lenses 2, 3.

The connecting portion 19 preferably ends with a hooked portion 20 which surrounds the pin portion 10, 11.

As illustrated, the hooked portion 20 has an end portion that runs in substantially the same direction as the corresponding connecting portion 19 from which it extends, that is to say, it is bent around the pin portion 10, 11.

The first and second connecting portions 18, 19 are connected by corresponding curved stretches 21, 22, 23 to the corresponding pin portions 10, 11 and to the abutment portion 17 from which they extend.

In other words, preferably, the connecting means 16 comprise a semi-annular portion 24 which extends from the pin portion 10, 11 on the side opposite the sidepiece means, in particular opposite the sidepieces 4, 5.

As illustrated, the semi-annular portion 30 comprises: the abutment portion 17 which is movable with the sidepiece means; and the first and second portions 18, 19, which connect the abutment portion 17 to the pin portions 10, 11 connected by the curved stretches 21, 22, 23.

As illustrated, the rotation stop means 16, in practice, comprise the semi-annular portion 30 which, with its abutment portion 17, comes into contact with the lenses 2, 3 to form a sort of opening limit stop for the sidepieces 4, 5.

In order to guarantee the rotation of the sidepieces 4, 5, the length of each connecting portion 18, 19 is greater than the distance between the respective insertion hole 12, 13 and the front transversal edge 2a, 3a of the lens means, in particular of the lenses 2, 3.

The length of each connecting portion 18, 19 is greater than the distance between the respective insertion hole 12, 13 and the outer lateral face 2b, 3b of the lens means, in particular of the lenses 2, 3.

Preferably, as illustrated, the length of each connecting portion 18, 19 is greater than the distance between the respective insertion hole 12, 13 and the outer lateral face 2b, 3b of the lens means, in particular of the lenses 2, 3, at the respective extension portion 14, 15.

FIGS. 4 to 9 illustrate a sequence of steps in a process for making the eyeglasses 1.

Illustrated in particular are the steps of coupling the sidepiece means, in particular the sidepieces 4, 5, to the lens means, in particular the lenses 2, 3.

For simplicity, the process is illustrated and described with reference to only one of the lenses and to the respective sidepiece.

The process of the invention comprises a step of inserting a metal wire 24 into the hole 13 in the lens means, in particular in the lens 3.

More in detail, the process comprises a sequence of steps of bending the metal wire to form the above mentioned rotation means.

As illustrated, for example, in FIGS. 4 and 5, the metal wire 24 is bent in such a way as to form the stop means 16 by which the rotation of the sidepiece means, in particular of the sidepiece 5, is stopped.

In particular, the process comprises a step of bending the metal wire 24 in such a way as to form a main longitudinal portion 25, a transversal portion 26 which extends from the main longitudinal portion 25, a second longitudinal portion 27 which is shorter than the main longitudinal portion 25 and which extends from the transversal portion 26.

Preferably, the process comprises a bending step in turn comprising a step of forming a second transversal portion 28 which extends from the second longitudinal portion 26.

Preferably, therefore, the process comprises a sequence of steps of bending the preferably metal wire to form an annular structure 29 delimited by the first and second longitudinal portions 25, 27 suitably connected by the transversal portions 26, 28.

With reference in particular to FIG. 5, it may be observed that the process comprises a step of inserting the main longitudinal portion 25 into the insertion hole 13 until the first transversal portion 26 is substantially in contact with the lens means, in particular with the lens 3.

In practice, preferably, the metal wire 24 forming the annular structure 29 is inserted into the lens means, in particular into the lens 3 through the hole 13.

As illustrated, the transversal portion 26 in particular comes into abutment against the lower edge 15a of the extension portion 15.

Advantageously, the step of inserting the main longitudinal portion 25 into the hole 13 is carried out from the bottom up considering a position in which the eyeglasses 1 are used, that is to say, from left to right looking for example at FIGS. 4 and 5.

With reference to FIG. 5, it may be observed that the process comprises a step of bending the second transversal portion 28 around the main longitudinal portion 25 to form the aforementioned hooked portion 20, shown in FIG. 6.

Preferably, if necessary, the process comprises a step of cutting the part of the second transversal portion 28 exceeding the hooked portion 20.

As illustrated in FIGS. 7 and 8, the process comprises a step of bending the main longitudinal portion 25 around the second transversal portion 28, in particular around the hooked portion 20.

Thus, the sidepiece 5 is preferably formed as a part which extends directly from the lens means, in particular from the lens 3.

In other words, the main longitudinal portion 25 preferably forms the body of the sidepiece 5.

To optimize the wearability of the eyeglasses 1, the process comprises a further step of bending the longitudinal portion 25, illustrated schematically in FIGS. 8 and 9.

This bending step is carried out about an axis which is substantially co-planar with the annular structure 29 so that the longitudinal portions 25 of the sidepiece means, in particular of the sidepieces 4, 5, are spaced in a manner suitable for use of the eyeglasses 1.

In other words, a portion 31 for hooking to the sidepiece means, in particular to the sidepiece 5 is formed.

Preferably, the portion 31 itself forms the sidepiece 5.

The eyeglasses as described have important advantages.

The sidepiece means are simply connected to the lens means to form the means for rotating the sidepieces. The sidepiece connecting means or each sidepiece itself forms a pin portion which is inserted directly into a respective hole to allow the sidepiece to rotate.

Given the preferred form of the portion for coupling to the lens means, the rotation means also serve a function of stopping the rotation of the sidepieces, that is to say, they form the aforementioned rotation stop means.

In particular, the stop means comprise the abutment portion which is movable with the sidepiece and which comes into abutment against the lens means.

The invention described above is susceptible of industrial application. Moreover, it would be obvious to one skilled in the art that several changes and modifications can be made to the invention without departing from the spirit and scope of the invention, described in depth above. Also, further embodiments of the invention comprising one or more of the features described herein can be easily imagined. It will also be understood that all the details of the invention may be substituted by technically equivalent elements.

The invention claimed is:

1. Eyeglasses, comprising:
 a) a lens;
 a sidepiece for supporting the eyeglasses;
 a connector across the lens and the sidepiece, the connector comprising a pin portion extending from the sidepiece, the lens having a hole for insertion of the pin portion, the pin portion being inserted into the insertion hole forming a rotator adapted for rotating the sidepiece relative to the lens
 b1) an extension portion which extends laterally from the lens and in which the insertion hole is made;
 b2) said extension portion extending substantially in a same plane as the lens; and
 b3) the insertion hole and the pin portion extend substantially vertically or in the plane of the lens.

2. The eyeglasses according to claim 1, wherein the extension portion extends horizontally or substantially horizontally.

3. The eyeglasses according to claim 1, wherein the connector comprises a device for stopping the rotation of the sidepiece.

4. The eyeglasses according to claim 3, wherein the rotation stop device comprises an abutment portion which is movable together with the sidepiece between a first position away from a front transversal edge of the lens and a second position in abutment against the front transversal edge of the lens.

5. The eyeglasses according to claim 3, wherein the rotation stop device comprises an abutment portion which extends vertically or substantially vertically.

6. The eyeglasses according to claim 3, wherein the rotation stop device comprises an abutment portion and a connecting portion joining the abutment portion to the pin portion.

7. The eyeglasses according to claim 6, wherein the connecting portion extends under the lens.

8. The eyeglasses according to claim 3, wherein the rotation stop device comprises a second connecting portion joining an abutment portion to the pin portion.

9. The eyeglasses according to claim 8, wherein the second connecting portion extends above the lens.

10. The eyeglasses according to claim 8, wherein the second connecting portion ends with a hooked portion that surrounds the pin portion.

11. The eyeglasses according to claim 1, wherein the connector comprises a semi-annular portion which extends from the pin portion on a side opposite the sidepiece.

12. The eyeglasses according to claim 1, wherein the lens comprises lenses, comprising a first and a second lens placed side by side.

13. The eyeglasses according to claim 1, wherein the sidepiece is formed from sidepieces made from metal wire.

14. The eyeglasses according to claim 1, wherein the sidepiece make with the corresponding pin portion an angle $\alpha$ of between 50 sexagesimal degrees and 90 sexagesimal degrees.

15. The eyeglasses according to claim 1, wherein the connector joining the sidepiece to the lens is shaped in such a way that the sidepiece in a closed configuration is positioned within a space delimited by the upper edge of the lens and by an edge of the lens.

16. The eyeglasses according to claim 1, wherein the rotator defines, for each of the pin portions an axis of rotation inclined at an angle $\beta$ of between 0 sexagesimal degrees and 10 sexagesimal degrees to the section plane of the eyeglasses, and wherein the insertion holes are inclined at an angle $\gamma$ of between 0 sexagesimal degrees and 10 sexagesimal degrees to a plane (P) perpendicular to the optical axis of the lens.

17. A process for making eyeglasses according to claim 1, the process comprising a step of inserting a metal wire, which forms the sidepiece of the eyeglasses, into an insertion hole in the corresponding lens of the eyeglasses, and at least one step of bending the metal wire to form the rotator.

* * * * *